April 24, 1934.  R. C. YANT  1,955,997
SCOOPING AND DUMPING HAND TRUCK
Filed Sept. 27, 1933    2 Sheets-Sheet 2
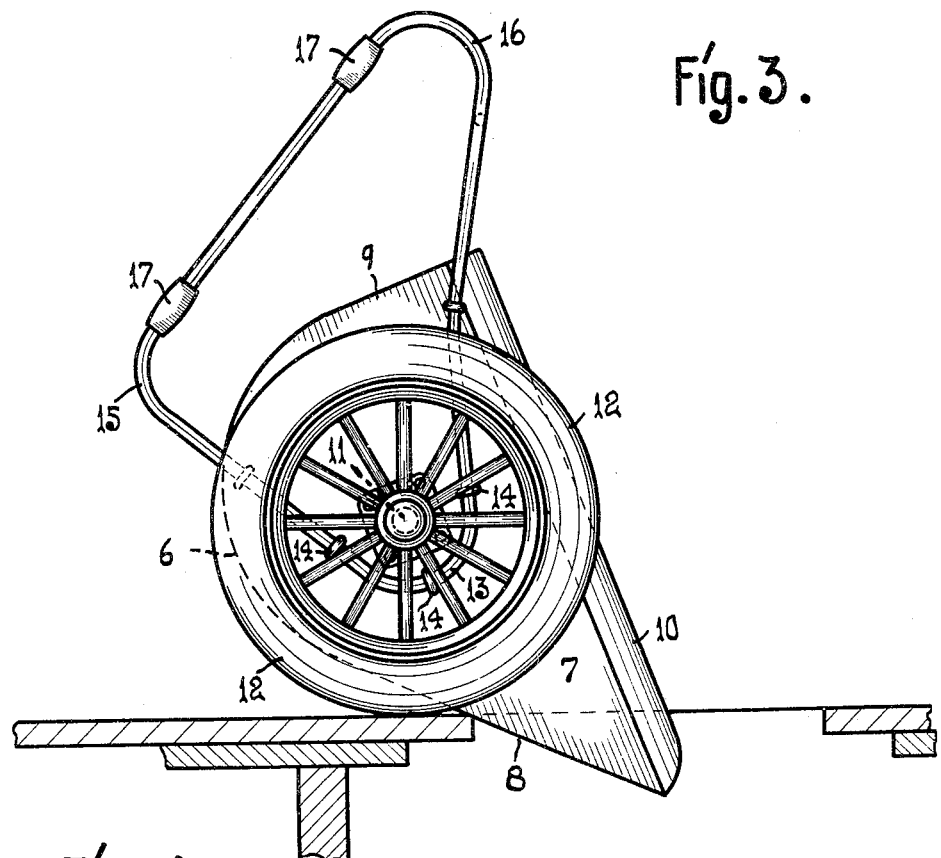
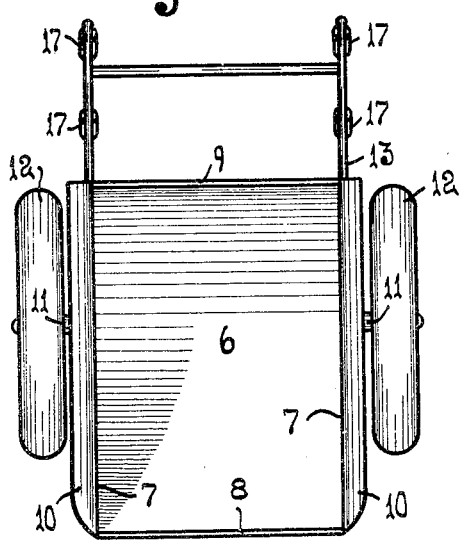
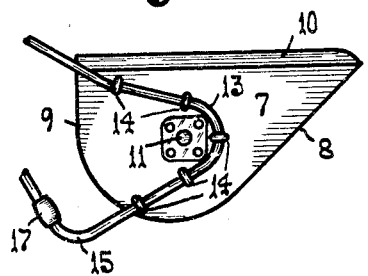
Inventor
R. C. Yant.
By Hiram A. Sturgs
Attorney Patented Apr. 24, 1934

1,955,997

UNITED STATES PATENT OFFICE 1,955,997

SCOOPING AND DUMPING HAND TRUCK

Raymond C. Yant, Omaha, Nebr.

Application September 27, 1933, Serial No. 691,142

2 Claims. (Cl. 37—130)

This invention relates to an improvement in transportation and more particularly to a scooping and dumping hand truck used in handling plastic and semiplastic material, such as mortar, prepared cement or the like. While found to be very useful in the loading, moving and dumping of plastic material it could be used for moving sand, gravel, crushed rock or similar material to advantage. The device is used principally in connection with work on buildings and in highway construction.

One object of the invention is to provide a container supported axially by a pair of side wheels to permit free swinging movements in a vertical plane under control of an operator, said axial support being so arranged between the top and bottom of the container that the center of gravity of the load will be disposed near the ground.

Another object is to provide an approximately flat intake for the front of the container which will permit loading, in part, when manually pushed into a body of semiplastic material, and which will lie upon the ground as a feature of advantage when loading is effected by use of hand shovels. It is an object to provide a container having a balanced axial support and a flat slideway so that the load may be conveniently dumped under control of an operator.

The invention includes a pair of trunnions on the opposed sides of the container for axial mountings of a pair of wheels and includes resilient means to prevent undue shocks and vibrations of the load during its carriage, and includes a frame found to be of advantage to an operator in the control of the load during its movements and for dumping.

With the foregoing objects in view the invention presents a new and useful construction, combination and arrangement of parts as described herein and claimed and as illustrated in the accompanying drawings, it being understood that changes may be made in size, proportions and minor details, said changes being within the scope of the invention as claimed.

In the drawings, Fig. 1 is a side view, partly broken, of a scooping and dumping hand truck embodying the invention.

Fig. 3 illustrates the position of parts arranged for dumping.

Fig. 4 is a plan view of the hand truck, and Fig. 5 is a detail showing the mounting of a trunnion and a control frame.

Figure 1:
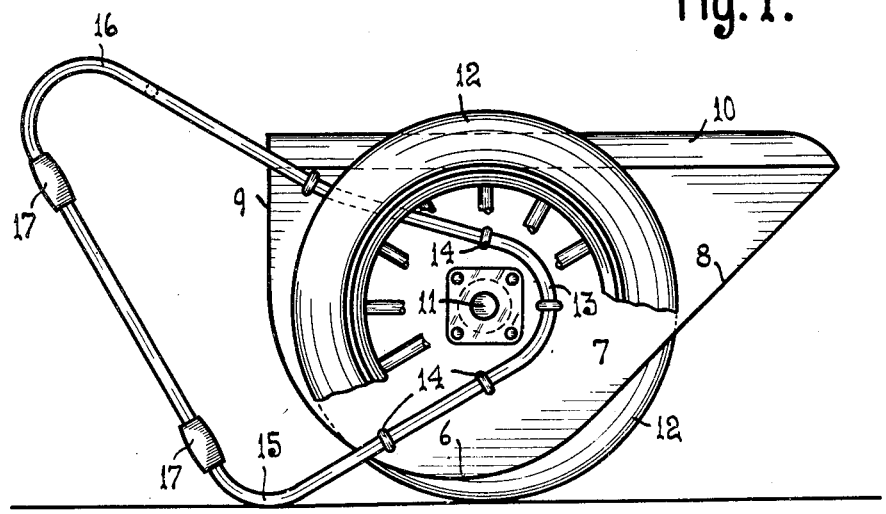

Referring now to the drawings for a more particular description, the invention consists, in part, of a box open at its top and having a curved bottom 6, its sides 7 being approximately parallel and its respective front and rear end walls 8 and 9 being disposed downwardly convergent. The box, preferably, is of elongated form and rectangular in plan. It will be noted that the front end wall of the box has no curvature but is of rectilinear form from its end to its junction with said curved bottom. Numeral 10 indicates a comb or holder-flange which projects somewhat above the side walls of the box, the front ends of said holders or flanges terminating at or closely adjacent to the front end 8 of the box.

Numeral 11 indicates a pair of spindles or trunnions which are secured to the sides of the box and which project outwardly therefrom, and at 12 are indicated a pair of wheels which are mounted on the trunnions.

The wheels, preferably, are provided with pneumatic tires for the reason that, in some instances, the load consists of plastic material and these resilient wheels tend to prevent undue vibration when the truck is moved toward the dump over rough ground, and in practice, the pneumatic tires will be found to be of advantage to prevent overflow and loss of a part of the load of plastic material.

It will be noted that the front end wall 8 has a greater length than the rear end wall 9. Also the degree of inclination of the front end wall 8, relative to the vertical axis of the box, is greater than the degree of inclination of the rear end wall 9, and these are features of importance.

Also it is important to provide a center of gravity for the load as near the ground as practicable since this will result in convenient loading and dumping and will operate to advantage when moving the load to the dump.

In order to attain these advantages the trunnions 11, carried by the wheels, are disposed in line with the transverse axis of the box. Also it may be said that, transversely considered, the trunnions are disposed in line with the center of gravity of the box and therefore in operation, the box may have free swinging movements between the wheels, and this pendulum like movement of the box and its load are of great advantage in the operations of loading and dumping.

The means for supporting and controlling the box and its load consist of a pair of loops 13 approximately of triangular form secured to the sides of the box by keepers 14, each loop having a downwardly projecting part 15 for engaging the ground, as may be required, and having a rearwardly projecting part 16 provided with handles 17 for manual control of the box and load.

Figure 2:
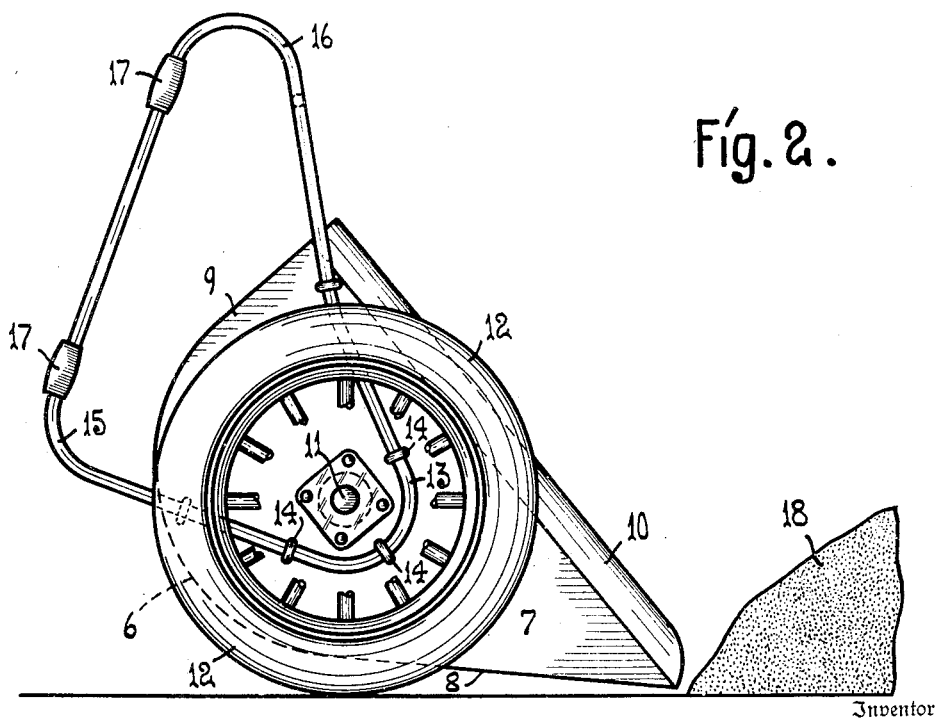
Fig. 2 is a side view of the same showing the position of parts arranged for loading, when the truck is pushed forwardly into a bed of semi-plastic material or sand for receiving a part of a load.

In operation, the box may be partly filled simply by pushing it into a bed 18 of the material shown in Fig. 2 of the drawings, the truck, for this purpose being moved forwardly, the flat front wall 8 and flange 10 operating as an intake-member forwardly of the truck, and said wall 8 being disposed approximately parallel with the ground. This operation results to save time and labor. After the box has been partly filled by this operation, the remaining part of the load may be completed manually by use of shovels. Since the box is so completely balanced the truck may be readily moved by an operator and may be conveniently swung to dumped position or placed in a suitable position to be loaded.

The preferred degree of inclination of the front end 8 relative to the vertical axis of the box is approximately 45 degrees, but may have a greater or lesser inclination if desired. While the box may be filled, in part, by forcibly pushing the truck and its box forwardly, as explained, this is practiced only when the material is plastic, so that the scoop-shaped front end of the box may be moved into the bed of material without undue resistance, but the rectilinear wall 8 together with its degree of inclination is of great advantage as an inclined slide when dumping a load, and when disposed substantially in a horizontal position, shown in Fig. 2, for convenience when loading.

I claim as my invention,—

1. In a scooping and dumping hand truck, an elongated box having a curved bottom and a pair of upright parallel sides, a pair of trunnions mounted on the sides and disposed in line with the transverse axis of the box, wheels journalled on the trunnions, a pair of connected loops approximately of triangular form secured to the sides of the box, each loop having a part providing a handle-member disposed rearwardly and in line with the top of the box and providing a second handle rearwardly of said box adapted to engage the ground for supporting the box in loading position, and for use in moving the box to dumped position.

2. In a scooping and dumping hand truck, an elongated box having a longitudinally curved bottom and pair of opposed parallel sides with holder-flanges projecting upwardly and outwardly therefrom, a pair of trunnions disposed in line with the transverse axis of the box and projecting outwardly from the sides thereof, wheels journalled on the trunnions, a pair of connected loops approximately of triangular form secured to the sides of the box, each loop having a part projecting rearwardly and above the box to provide a handle member, and having a part projecting rearwardly and below the box providing a second handle-member for supporting said box in loading position and for use in moving said box to dumped position, said bottom and sides and said holder-flanges providing a forwardly convergent scoop for said box.

RAYMOND C. YANT.